(12) United States Patent
Castelino et al.

(10) Patent No.: US 9,824,019 B2
(45) Date of Patent: Nov. 21, 2017

(54) EVENT SPECIFIC PAGE FAULTS FOR INTERRUPT HANDLING

(71) Applicant: Intel Corporation, Santa Clara, CA (US)

(72) Inventors: Manohar R. Castelino, Santa Clara, CA (US); John Hinman, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 202 days.

(21) Appl. No.: 14/750,328

(22) Filed: Jun. 25, 2015

(65) Prior Publication Data
US 2016/0378677 A1    Dec. 29, 2016

(51) Int. Cl.
*G06F 13/24*    (2006.01)
*G06F 13/32*    (2006.01)
*G06F 12/1009*    (2016.01)

(52) U.S. Cl.
CPC .......... *G06F 12/1009* (2013.01); *G06F 13/24* (2013.01)

(58) Field of Classification Search
CPC ............................. G06F 13/24; G06F 12/1009
USPC .......................................................... 710/269
See application file for complete search history.

(56) References Cited

U.S. PATENT DOCUMENTS 5,668,971 A * 9/1997 Neufeld ................ G06F 13/385
710/105

* cited by examiner

*Primary Examiner* — Chun-Kuan Lee

(57) ABSTRACT

Various embodiments are generally directed to instrumenting an interrupt service routine. A non-executable address may be provisioned and added to an execution stack to cause a page fault on a known address after execution of an interrupt service routine. The page fault on the known address can be used to trigger instrumentation operations and also to return to the interrupted process.

25 Claims, 10 Drawing Sheets

EVENT SPECIFIC PAGE FAULTS FOR INTERRUPT HANDLING

TECHNICAL FIELD

Embodiments described herein generally relate to interrupt service handling for a computing device.

BACKGROUND

Computing devices typically are configured to receive interrupts. In general, an interrupt is a control signal communicated by hardware or software indicating an event that needs attention. Upon receipt of an interrupt, the computing device typically executes an interrupt service routine (or interrupt handler) to handle the event. More specifically, execution of the current process is passed to the interrupt service routine and then back to the current process.

DETAILED DESCRIPTION

Figure 1:
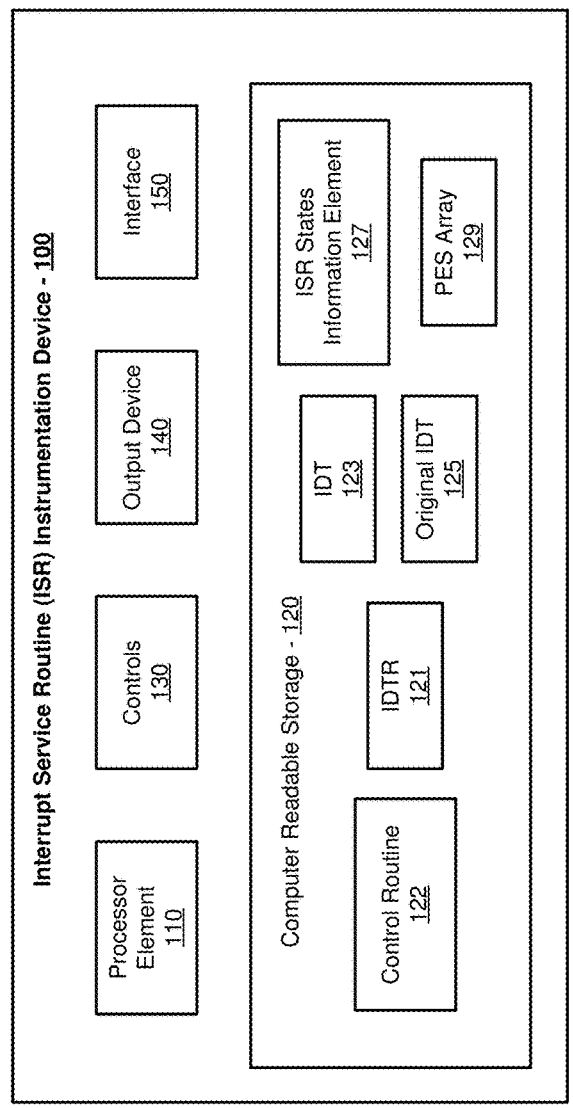
FIG. 1 illustrates a block diagram of a device according to an embodiment.

Various embodiments are generally directed to instrumenting an interrupt service routine (ISR). Said differently, various embodiments are generally directed to executing one or more processes after an ISR executes and prior to resuming the interrupted process. For example, the present disclosure may be implemented to determine the effects of the ISR before returning to the interrupted process. With some examples, a computing device may be configured to generate a unique page fault for each instance of an ISR. In response to the page fault, the computing device may be configured execute one or more post-ISR instructions prior to returning to the interrupted service.

It is important to note, various embodiments of the present disclosure may provide for instrumentation of ISRs without modifying the individual instructions corresponding to each ISR.

Additionally, the present disclosure provides for instrumentation of interrupts, even where the same thread may be interrupted a second time before completing handling of the first interrupt. In particular, as a unique address (e.g., to cause a page fault to execute post-ISR instrumentation) is generated for each interrupt, multiple interrupts of the same thread can be handled. In some examples, the present disclosure may be implemented in security applications or within secured hardware portions of a computing device. For example, the present disclosure may be implemented by hardware, software, or a combination of hardware and software within a secure portion of a computing device to enable instrumentation and interrupt service without substantially compromising the security of the system.

Furthermore, the present disclosure provides for securely instrumenting interrupts for interrupted processes that are executing in user space (e.g., Ring 3). In particular, it is noted, that adding an address to a post-ISR routine to an execution stack is insufficient to cause instrumentation as once the ISR completes, the execution will return to Ring 3. However, by creating a page fault as described herein, the execution transparently transitions a second time from Ring 3 to Ring 0 to provide for post-ISR instrumentation. As such, various embodiments of the present disclosure may provide for instrumentation of interrupts originating from user space (e.g., Ring 3) without instrumenting a return point of the user space instructions, thereby increasing the security of the system.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 depicts a block diagram of an interrupt service routine (ISR) instrumentation device 100. In general, the device 100 may be any of a variety of types of computing devices, including without limitation, a laptop computer, a netbook computer, an ultrabook computer, a tablet computer, a handheld personal data assistant, a smartphone, a body-worn computing device (e.g., a wearable accessory, clothing, or the like,) a media streaming device, an audio computing device, a video computing device, a smart television, or the like.

With various examples, the device 100 incorporates one or more of processor element 110, computer-readable storage 120, controls 130, an output device 140, and an interface 150. The computer-readable storage 120 stores one or more of a control routine 122, an IDT register (IDTR) 121, an interrupt descriptor table (IDT) 123, an original IDT 125, an ISR states information element 127, and a pseudo-entry stub array information element 129. It is important to note, that although the IDTR 121, the IDT 123, and the original IDT 125 are depicted within storage 120, they may in some embodiments, be included in another component of device 100. For example, the IDTR 121 may be a register of the processor element 110, or the like.

Additionally, although not depicted, the device 100 may be operably connected to one or more networks, including the Internet, and may be operably coupled to one or more other devices via the network, for example, via the interface 150.

In general, the control routine 122 incorporates a sequence of instructions operative on the components of the device 100 (e.g., the processor element 110, or the like) to implement logic to instrument an interrupt service routine. Said differently, the control routine 122 may be configured to instrument an interrupt service routine initiated or invoked in response to an interrupt received by components of the device 100 (e.g., the processor element 110, or the like).

In executing the control routine 122, the processor element 110 may load the IDTR 121 with an address pointing to the IDT 123. In general, the IDT 123 is an information element (e.g., data structure, or the like) including vectors, each of which indicates a response to various events (e.g., interrupts, exceptions, page faults, or the like). In some examples, a number of the entries in the IDT 123 (e.g., vectors, or the like) may be hooked. Hooked entries in the IDT 123 may point (e.g., address, correspond to, or the like) to unique interrupt handlers (discussed in greater detail below). With some examples, a number of the entries in the IDT 123 may be unhooked. Unhooked entries in the IDT 123 may be copies of entries from the original IDT 125.

In some examples, the control routine 122 may load the IDTR 121 with the address of the IDT 123 upon initialization (e.g., startup, boot, or the like) of the device 100. In some examples, the control routine 122 may load the IDTR 121 with the address of the IDT 123 upon receipt of an interrupt.

Additionally, in executing the control routine 122, the processor element 110 may receive an interrupt, for example, from another component of the device 100 (e.g., the controls 130, the output device 140, the interface 150, or the like) or from an application executing on the device 100. In response to the received interrupt, the processor element 110 saves a vector from the IDT 123 to an execution stack (e.g., refer to FIG. 2), saves the state of the processor element 110 and then either (1) initiates setup of ISR instrumentation (e.g., refer to FIG. 3) or (2) exits from ISR instrumentation (e.g., refer to FIG. 5).

In general, ISR instrumentation setup includes allocating a protected (e.g., Ring 0, or the like) address that is not executable in hardware to intentionally cause a page fault. This address is placed onto the execution stack such that after the operating system ISR routine (e.g., refer to FIG. 4) is executed, a page fault will be generated. Additionally, the address of the interrupting thread, various device 100 states (e.g., state of the processor element 110, or the like,) and the IDT 121 vector from the received interrupt are saved into the ISR states information element 127. After execution of the ISR, the page fault address is used to index into the ISR states information element 127 and retrieve the saved interrupt context to return control to the interrupted thread.

In various embodiments, the processor element 110 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments any number of the processor element 110 may include a trusted execution environment (e.g., Intel CSE®, Intel ME®, Intel VT®, Intel SGX®, ARM TrustedZone®, or the like) to provide for the processing and/or storing of sensitive information. The trusted execution environment may be access using the geo-location techniques described herein.

In various embodiments, the storage 120 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the controls 130 may be any of a variety of types of manually operable control including and not limited to one or more of a keyboard, mouse, keypad, touchpad, stylus, or the like. The output device may be local or remote and may be connected wirelessly or wired. In various embodiments, the output device 140 may be any of a variety of output devices, such as, for example, a display, a speaker, a haptic feedback device, or the like.

In various embodiments, the interface 150 may employ any of a wide variety of signaling technologies enabling the components to be coupled through a network.

Figure 2:
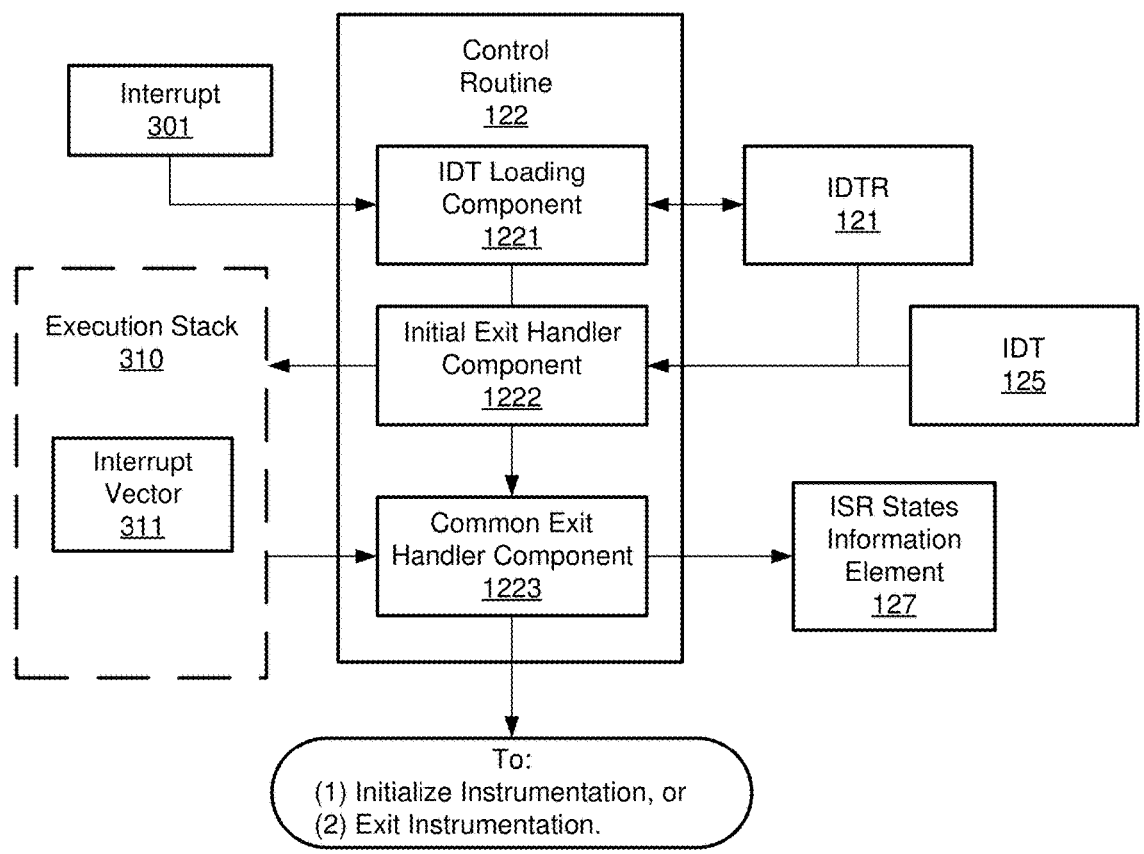
FIGS. 2-5 each illustrate block diagrams of aspects of the operation of the device of FIG. 1 according to various embodiments.
Figure 3:
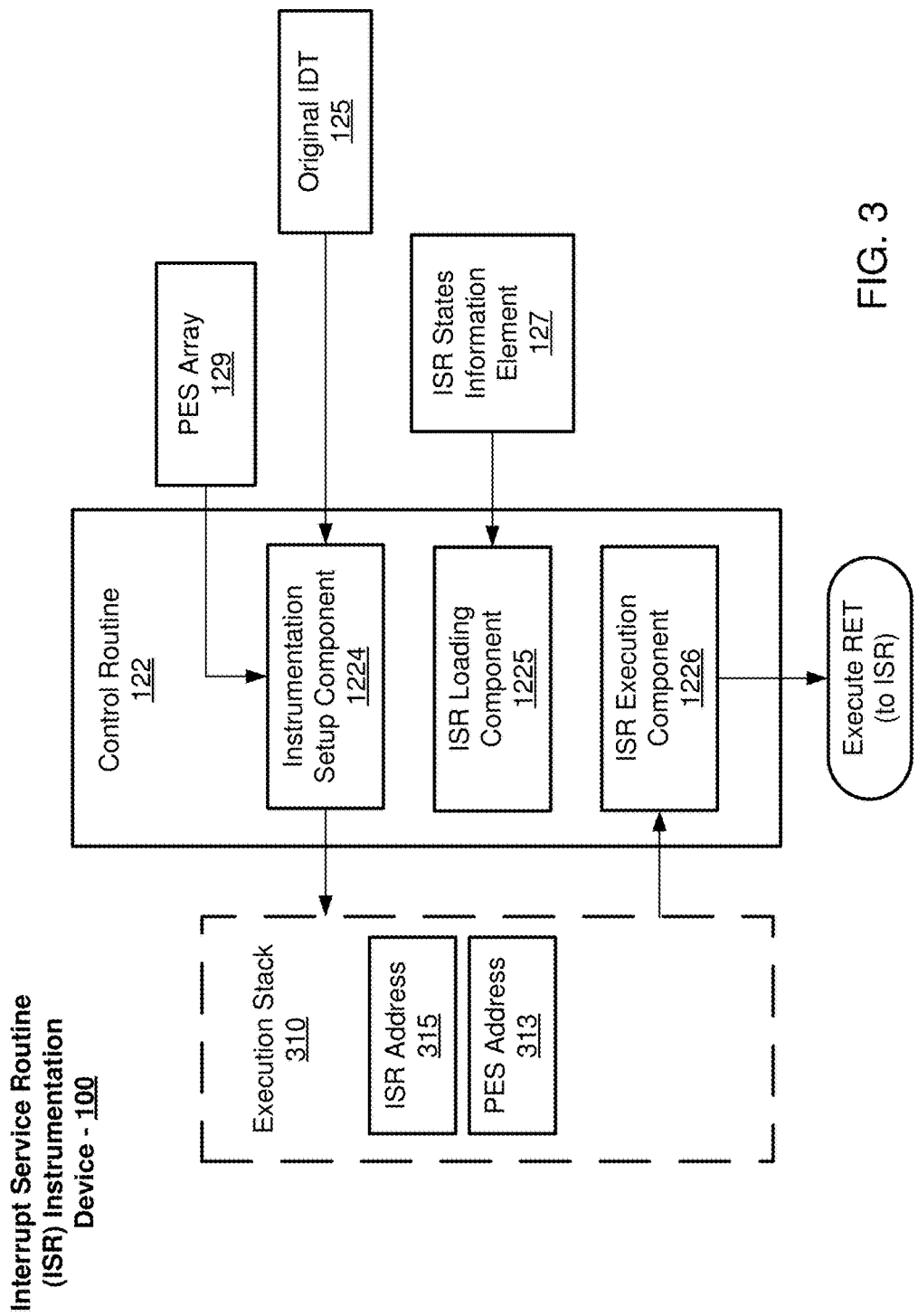
Figure 4:
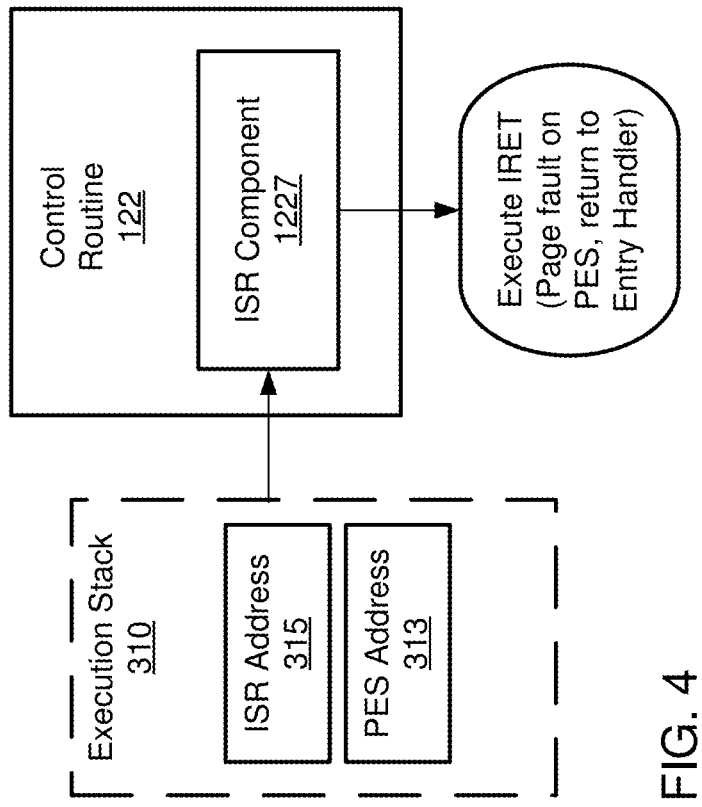
Figure 5:
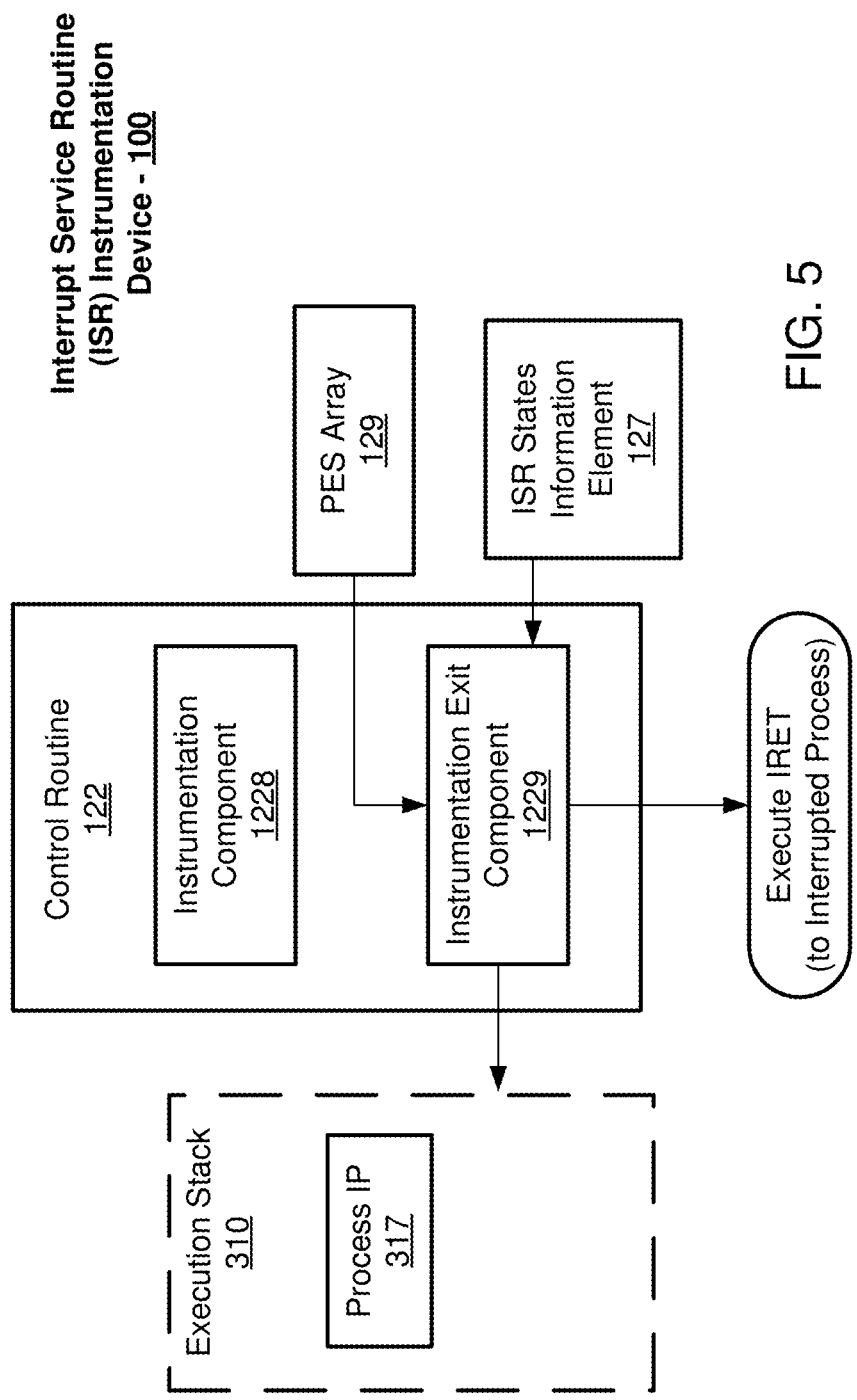

FIGS. 2-5 are block diagrams of portions of embodiments of the ISR instrumentation device 100 of FIG. 1. For example, these figures illustrate aspects of the operation of the control routine 122, in implementing interrupt handling and instrumentation, according to at least one example of the present disclosure. In general, FIG. 2 illustrates aspects of the operation of the device 100 in initially receiving an interrupt; FIG. 3 illustrates aspects of the operation of the device 100 in setting up for ISR instrumentation; FIG. 4 illustrates aspects of the operation of the device 100 in executing an ISR; and FIG. 5 illustrates aspects of the operation of the device 100 in exiting ISR instrumentation and returning to the interrupted process.

In various embodiments, the control routine 122 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor element 110. Where one or more device drivers are included, those device drivers may provide support for any of a variety of other components, whether hardware or software components, of the device 100.

Figure 6:
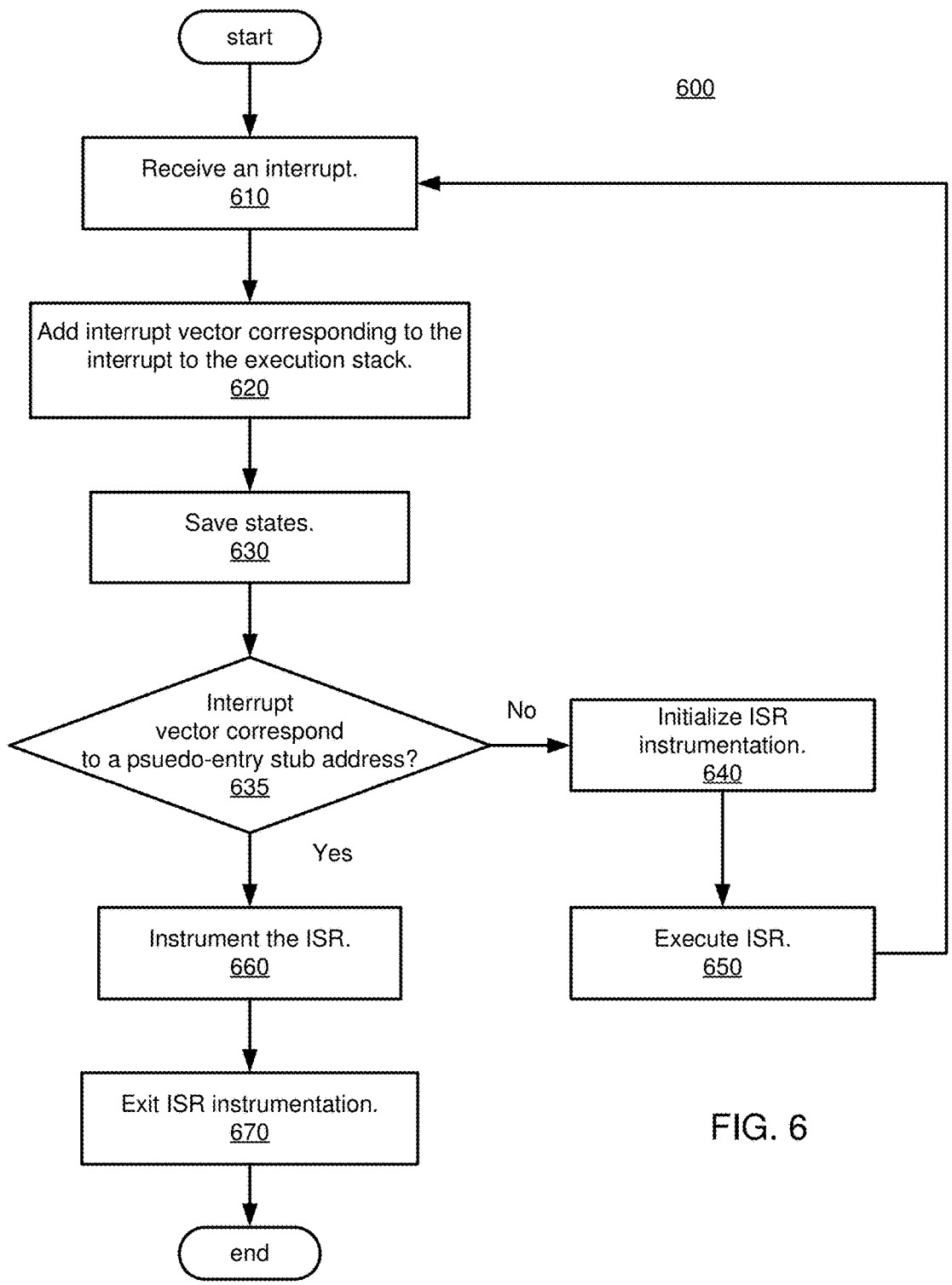
FIGS. 6-8 each illustrate logic flows according to various embodiments.
Figure 7:
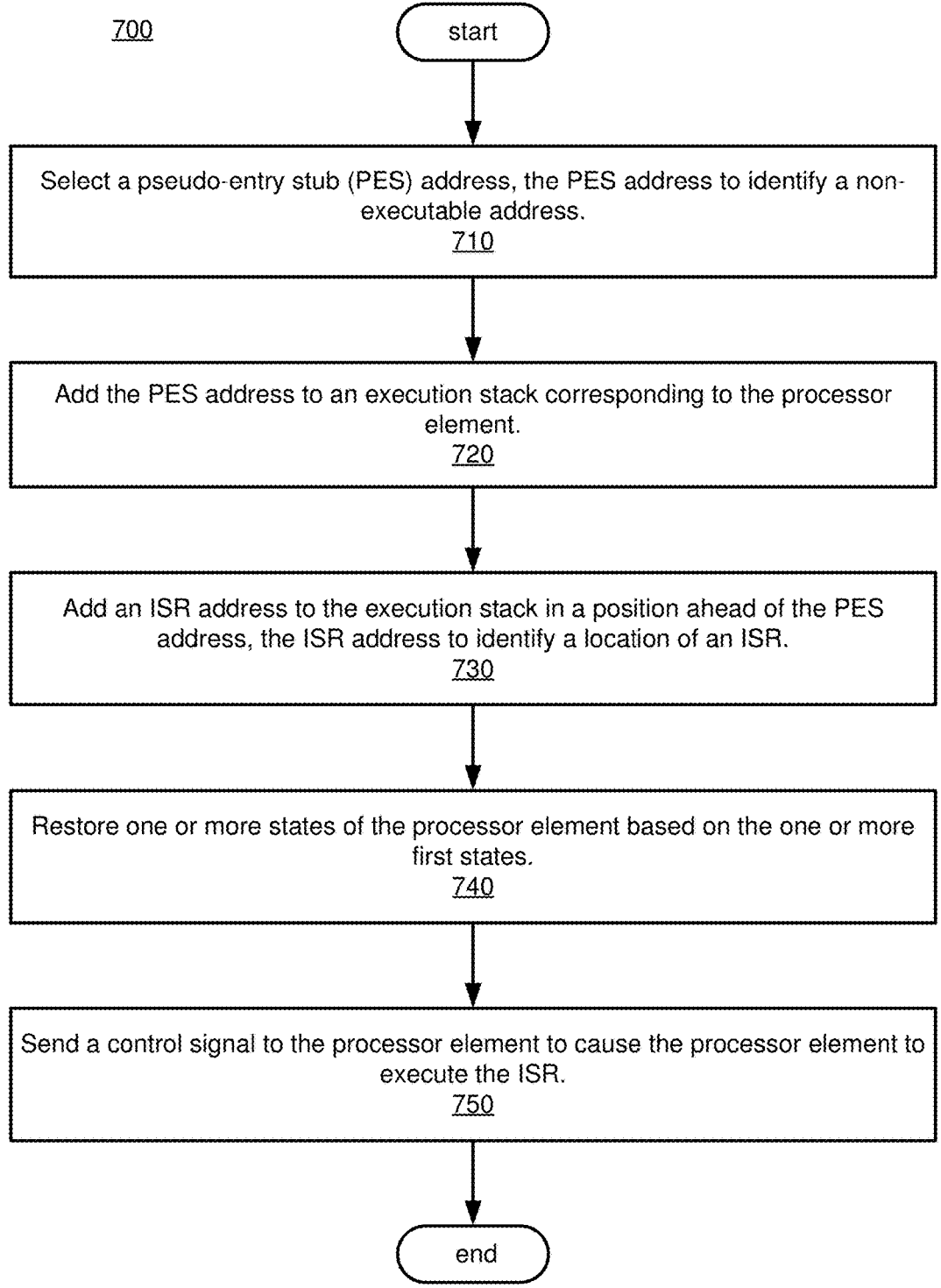
Figure 8:
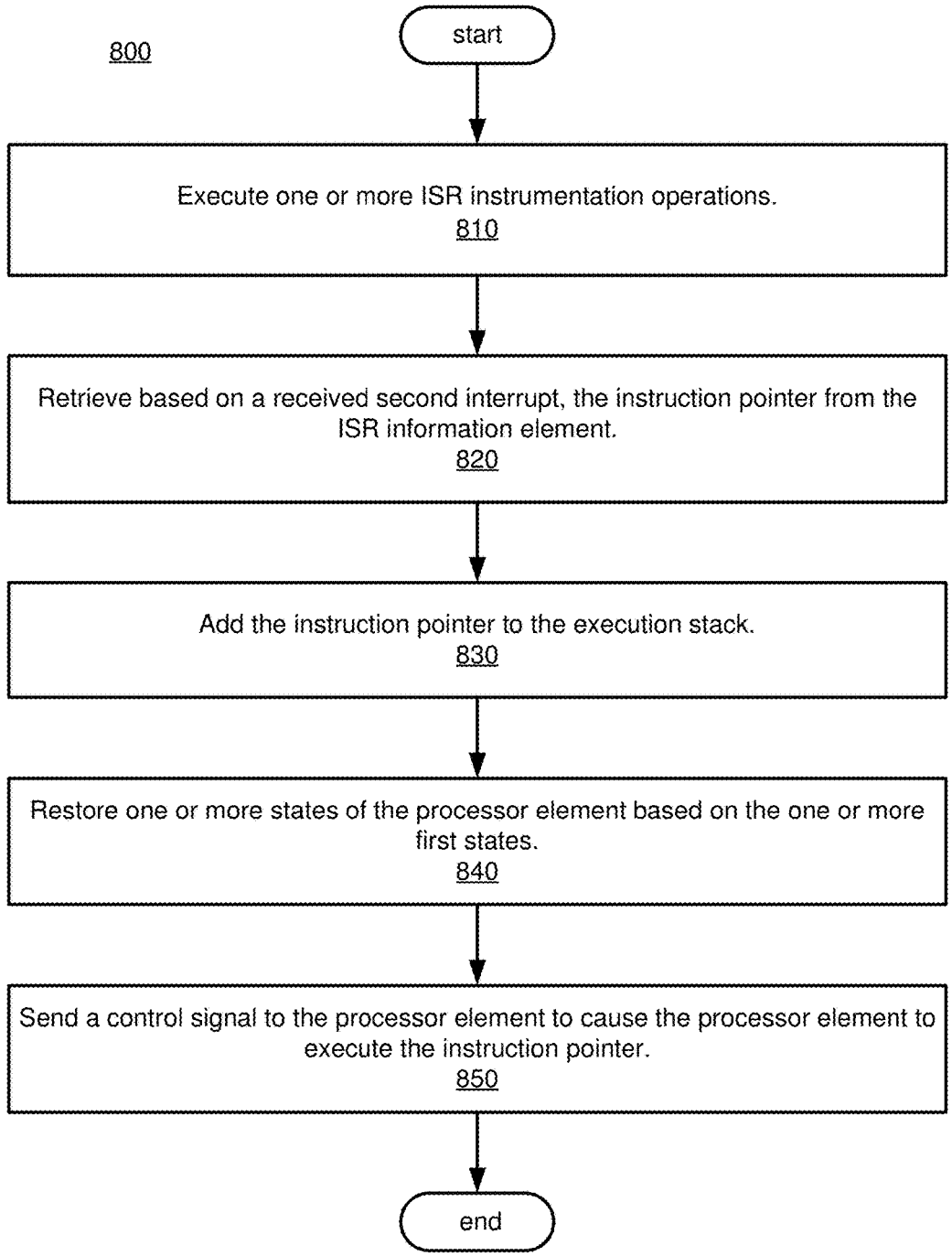

FIGS. 6-8 illustrate embodiments of logic flows for instrumenting an interrupt service routine, according to at least some examples of the present disclosure. These figures are described with reference to the ISR instrumentation device 100 of FIG. 1 and additionally, the examples depicted in FIGS. 2-5. However, examples as not to be limited in this context. In general, FIG. 6 illustrates a logic flow 600 to handle and to instrument an interrupt service routine; FIG. 7 illustrates a logic flow 700 to set up for ISR instrumentation; and FIG. 8 illustrates a logic flow 800 to exit ISR instrumentation and return to the interrupted process.

Turning initially to FIG. 6, the logic flow 600 may begin at block 610. At block 610, "receive an interrupt," the control routine 122 may receive an interrupt (e.g., a component of the device 100, from an executing application, or the like). In particular, the processor element 110 may receive an interrupt. Continuing to block 620, "add an interrupt vector corresponding to the interrupt to the execution stack," the control routine 122 may add a vector corresponding to the interrupted thread to an execution stack. For example, the control routine 122 may retrieve a vector from the IDT 123 based on the received interrupt and add the vector to the execution stack for the processor element 110. Continuing to block 630, "save states," the control routine 122 may save state(s) of the processor element 110, for example, to the ISR states information element 127.

The logic flow 600 may then either continue to block 640, "initialize ISR instrumentation" or continue to block 660, "instrument the ISR." More specifically, the logic flow 600 may, at block 635, determine whether the "interrupt vector corresponds to a pseudo-entry stub address" or not. More specifically, at block 635, the control routine may determine whether the received interrupt is a page fault and whether the faulting address corresponds to a pseudo-entry stub routine used to introspect ISRs. Said differently, if the interrupt is either not a page fault or the faulting address does not correspond to an address reserved for pseudo-entry stub routines, then the interrupt should be instrumented and the logic flow 600 can continue to block 640. However, if the interrupt is the result of a page fault and the faulting address is an address reserved for pseudo-entry stub routines, the logic flow 600 can continue to block 660.

At block 640, "initialize ISR instrumentation," the control routine 122 may initialize the instrumentation and particularly may setup an execution stack to trigger a page fault upon completion of the ISR. This is described in greater detail below, for example, with respect to FIG. 3 and FIG. 7. Continuing to block 650, "execute the ISR," the control routine 122 may cause the ISR to be executed. For example, the control routine may execute a return from subroutine (RET) command. Upon completion of the ISR, the ISR may execute an interrupt return (IRET) command. However, as the ISR initialization (e.g., at block 640) setup the page fault to be triggered after the ISR, another interrupt, caused by the page fault, will be received. As such, the logic flow will return to block 610, with the difference being, that the page fault will correspond to a pseudo-entry stub address (described in greater detail below) and the logic flow will branch to block 660 as described above.

At block 660, "instrument the ISR," the control routine 122 may execute one or more instrumentation operations. For example, the control routine 122 may execute one or more profiling or benchmarking operations to monitor the effects of the interrupt on the device 100 and/or the operation of the device 100. Continuing to block 670, "exit the ISR instrumentation," the control routine may return control back the interrupted process. This is described in greater detail below, for example, with respect to FIG. 5 and FIG. 8.

Turning more specifically to FIG. 2, aspects of the operation of the device 100 in receiving an interrupt, and particularly, aspects of the control routine 122, are depicted. With some examples, the control routine 122 includes an IDT loading component 1221, an initial exit handler component 1222, and a common exit handler component 1223.

The IDT loading component 1221 may load (e.g., store, or the like) the address of the IDT 123 into the IDTR 121. Additionally, the IDT loading component 1221 may save the address of the original IDT 125. In some examples, the IDT loading component 1221 may, based on the received an interrupt 301, load the address of the IDT 123 into the IDTR 121. With some examples, the IDT loading component 1221 may load the address of the IDT 123 into the IDTR 121 at initialization (e.g., startup, boot, or the like) of the device 100.

The initial exit handler component 1222 may save the interrupt vector (e.g., vector corresponding to the interrupt from the IDT 123, or the like) on the stack, and pass control (e.g., jump, or the like) to the common exit handler component 1223. More specifically, the initial exit handler 1222 may read the IDTR 121 to access the address of the IDT 123 and particular, the entry of the IDT 123 corresponding to the interrupt 301. The initial exit handler component 1222 may save the entry as the interrupt vector 311 to the execution stack 310. In some examples, there may be a number of initial exit handler components 1222. For example, a particular initial exit handler component may be executed by the control routine 122 based on the interrupt 301 and the corresponding entry in the IDT 123.

The common exit handler component 1223 may save the state of the processor element 110. For examples, the common exit handler component 1223 may save an indication of the state of the processor element 110 to the ISR states information element 127. Additionally, the common exit handler component 1223 may determine whether the interrupt vector 311 corresponds to a page fault or not and if the interrupt corresponds to a page fault, whether the page fault is a pseudo-entry stub (PES) address (described in greater detail below) page fault. For example, the common exit handler component 1223 may implement block 635 of the logic flow 600. The common exit handler component 1223 may initialize ISR instrumentation (e.g., refer to FIG. 3) based on a determination that the interrupt does not correspond to a page fault or does not correspond to a page fault from a PES address. The common exit handler component 1223 may exit ISR instrumentation (e.g., refer to FIG. 5) based on a determination that the interrupt is a page fault and corresponds to a pseudo-entry stub address.

Turning more specifically to FIG. 3, aspects of the operation of the device 100 to initialize ISR instrumentation, and particularly, operation of the control routine 122 are described. With some examples, the control routine 122 additionally includes a pseudo-entry stub (PES) component 1224, an ISR loading component 1225, and an ISR execution component 1226.

The PES component 1224 may select an address from an array of a non-executable address. For example, the PES component 1224 may select an address of the PES array 129 and add the address to the execution stack 310. In some examples, the PES array 129 may be a memory page of non-executable (e.g., non-executable by the processor element 110, or the like) addresses. In some examples, the PES component 1224 may select the address from the PES array 129 by identifying the first free position in a bitwise array of lock bits. The index of bits within the array can correspond to the index of the address used to cause the page fault. Additionally, the index can be used for any storage of data for the duration of the ISR. For example, the ISR states information element 127 may be stored in the PES array 129 using the index or an indication of the location of the ISR states information element 127 may be stored in the PES array at the index. It is important to note, that the index may be locked to provide that the PES address is unique.

The ISR loading component 1225 may save any states (e.g., processor element 110 states, or the like) and also the instruction pointer address (e.g., from the execution stack 310, or the like) of the interrupted process. With some examples, the ISR loading component may save indications of this information in the ISR states information element 127. Additionally, the ISR loading component 1225 may add the address of the ISR corresponding to the interrupt 301 to the execution stack 310. More specifically, the ISR loading component 1225 may retrieve the ISR address from the original IDT 125 and add the address to the top of the execution stack 310. In some examples, the ISR loading component adds the ISR address 315 to the execution stack 310 "ahead" or the PES address 313. More specifically, the ISR address 315 will execute prior to the PES address 313.

The ISR execution component 1226 may restore the states (e.g., the processor element state, or the like). In particular, the ISR execution component 1226 may restore the states from the indication of the states in the ISR states information element 127. Additionally, the ISR execution component 1226 may execute a RET command to pass control to the ISR.

Turning more specifically to FIG. 7, the logic flow 700 is depicted. In general, the logic flow 700 may be implemented to initialize ISR instrumentation. In some examples, the device 100 and particularly, the control routine 122, may implement the logic flow 700. Examples, however, are not limited in this context. The logic flow 700 may begin at block 710. At block 710, "select a pseudo-entry stub (PES) address, the PES address to identify a non-executable address" the control routine 122 may select a PES address. For example, the instrumentation setup component 1224 may select a PES address 313 from the PES array 129.

Continuing to block 720, "add the PES address to an execution stack corresponding to the processor element" the control routine 122 may add the PES address to an execution stack. For example, the instrumentation setup component 1224 may add the PES address 313 to the execution stack 310. Continuing to block 730, "add an ISR address to the execution stack in a position ahead of the PES address, the ISR address to identify a location of an ISR" the control routine 122 may add an ISR address to the execution stack. For example, the ISR loading component 1225 may add the ISR address 315 to the execution stack 310 ahead of the PES address 313.

Continuing to block 740, "restore one or more states of the processor element based on the one or more first states" the control routine 122 may restore one or more states of the processor element. For example, the ISR loading component 1225 may restore one or more states of the processor element 110 based on indications of processor element states in the ISR states information element 127. Continuing to block 750, "send a control signal to the processor element to cause the processor element to execute the ISR" the control routine 122 may send a control routine to the processor element to cause the processor element to execute the ISR. For example, the ISR execution component 1226 may issue the RET command.

Turning more specifically to FIG. 4, aspects of the operation of the device 100 to execute the ISR, and particularly, operation of the control routine 122 are described. With some examples, the control routine 122 additionally includes an ISR component 1227. It is important to note, that the control routine 122 may include a number of ISR component 1227 (e.g., one for each ISR address 315, corresponding to the variety of interrupts, or the like). However, a single ISR component 1227 is depicted for clarity. Upon completion of the ISR routine, the ISR component 1227 may execute IRET to pass control back to the interrupted process. However, as the instrumentation initialization added the PES address 313 to the execution stack 310, a page fault will be triggered. As described above, the page fault and particularly since the page fault corresponds to a PES address, will cause the device to exit ISR instrumentation.

Turning more specifically to FIG. 5, aspects of the operation of the device 100 to exit ISR instrumentation, and particularly, operation of the control routine 122 are described. With some examples, the control routine 122 additionally includes an instrumentation component 1228 and an instrumentation exit component 1229. The instrumentation component 1228 may perform a number of instrumentation operations (e.g., profiling, benchmarking, or the like). It is important to note, that the number and type of instrumentation operations can vary and may depend upon the implementation. Accordingly, examples are not limited in this context.

In general, the instrumentation exit component 1229 restores the states from before the initial interrupt (e.g., the interrupt 301) and returns control to the interrupted process. In particular, the instrumentation exit component 1229 determines an index to recover the ISR states information element 127. For example, with some examples the instrumentation exit component 1229 determines the index by subtracting the faulting address (e.g., the address that caused the PES page fault, or the like) from the base of the PES array 129 and by dividing by the size of the array element. Additionally, the instrumentation exit component 1229 can locate the saved instruction pointer 317 (e.g., the instruction pointer for the instructed process, or the like) and restore it to the execution stack 310. Furthermore, the instrumentation exit component 1229 may release the lock bit on the address in the PES array 129 and may restore the saved state(s) (e.g., the saved processor element states, or the like). Additionally, the instrumentation exit component 1229 may execute an IRET command to return control to the interrupted process.

Turning more specifically to FIG. 8, the logic flow 800 is depicted. In general, the logic flow 800 may be implemented to exit ISR instrumentation. In some examples, the device 100 and particularly, the control routine 122, may implement the logic flow 800. Examples, however, are not limited in this context. The logic flow 800 may begin at block 810. At block 810, "execute one or more ISR instrumentation operations" the control routine 122 may execute one or more instrumentation operations. For example, instrumentation component 1228 may execute one or more instrumentations (e.g., profiling, benchmarking, or the like) operations.

Continuing to block 820, "retrieve, based on a received second interrupt, the instruction pointer from the ISR information element" the control routine 122 may retrieve the process instruction pointer (IP) 317. For example, the instrumentation exit component 1229 may retrieve the process IP 317 from the ISR states information element 127 and add the process IP 317 to the execution stack 310. Continuing to block 730, "add the instruction pointer to the execution stack" the control routine 122 may add the process IP to the execution stack. For example, the instrumentation exit component 1229 may add the process IP 317 to the execution stack 310.

Continuing to block 840, "restore one or more states of the processor element based on the one or more first states" the control routine 122 may restore one or more states of the processor element. For example, the instrumentation exit component 1229 may restore one or more states of the processor element 110 based on indications of processor element states in the ISR states information element 127. Continuing to block 850, "send a control signal to the processor element to cause the processor element to execute the instruction pointer" the control routine 122 may send a control routine to the processor element to cause the processor element to execute the process IP 317. For example, the instrumentation exit execution component 1226 may issue the IRET command.

Figure 9:
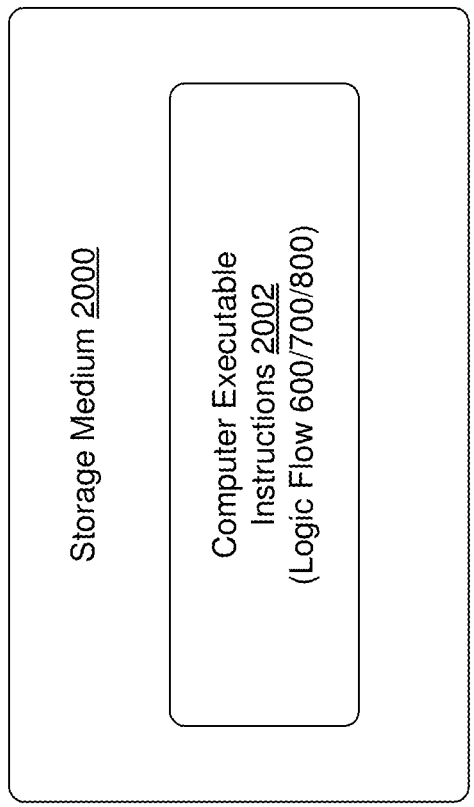
FIG. 9 illustrates an embodiment of computer-readable storage medium.

FIG. 9 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to technique 600. In some examples, the storage medium 2000 may store various types of computer executable instructions to implement logic flow 700. In some examples, the storage medium 2000 may store various types of computer executable instructions to implement logic flow 800.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
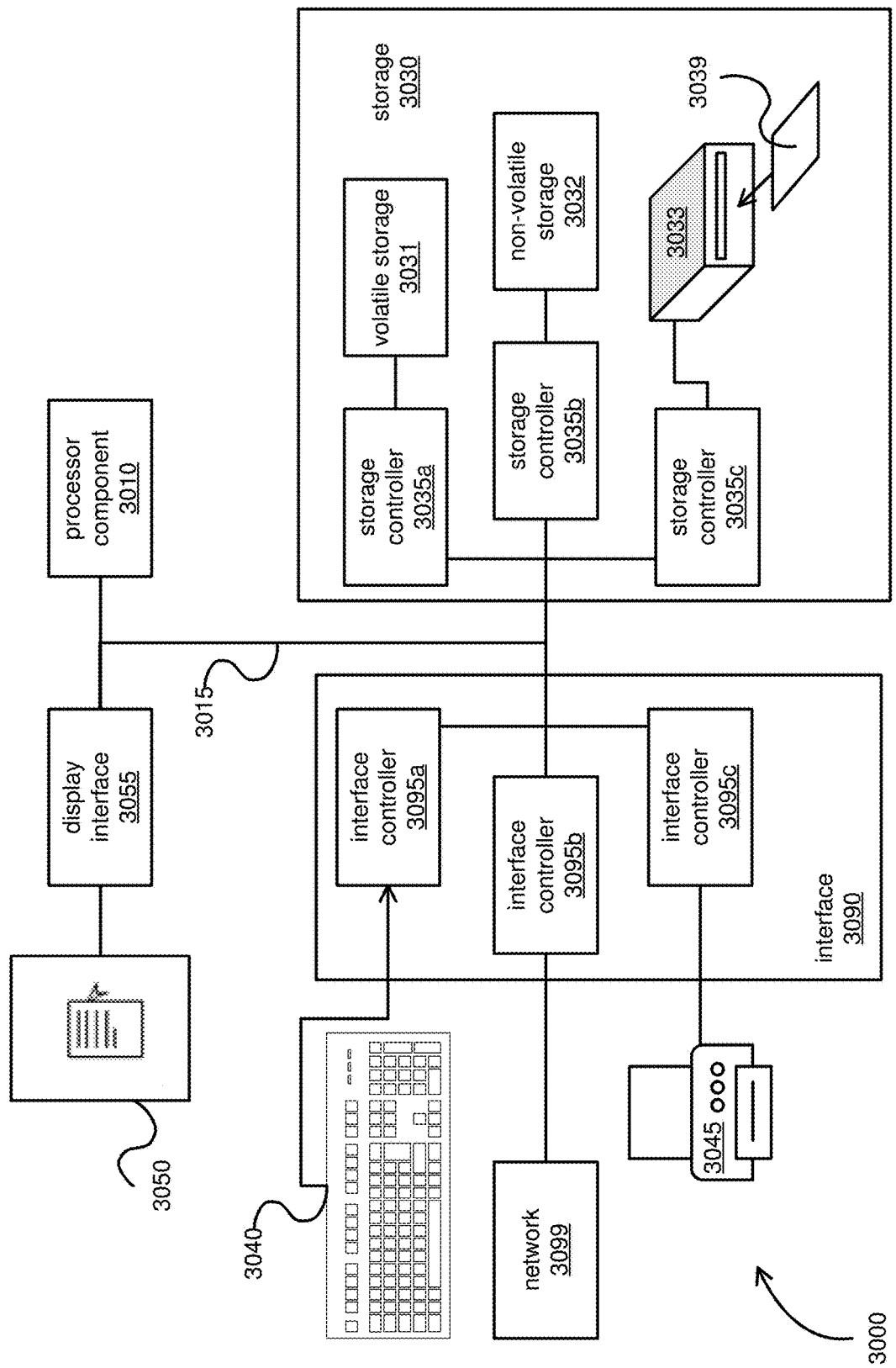
FIG. 10 illustrates an embodiment of a processing architecture.

FIG. 10 illustrates an embodiment of an exemplary processing architecture 3000 suitable for implementing various embodiments as previously described. More specifically, the processing architecture 3000 (or variants thereof) may be implemented as part of the device 100 of FIGS. 1-5.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 3010, a storage 3030, an interface 3090 to other devices, and coupling 3015. Depending on various aspects of a computing device implementing the processing architecture 3000, including its intended use and/or conditions of use, such a computing device may further incorporate additional components, such as without limitation, a counter element 3015.

The coupling 3015 incorporates one or more buses, point-to-point interconnects, transceivers, buffers, crosspoint switches, and/or other conductors and/or logic that communicatively couples at least the processor element 3010 to the storage 3030. The coupling 3015 may further couple the processor element 3010 to one or more of the interface 3090 and the display interface 3055 (depending on which of these and/or other components are also present). With the processor element 3010 being so coupled by couplings 3015, the processor element 3010 is able to perform the various ones of the tasks described at length, above, for whichever ones of the computing devices 100, 300 and 600 implement the processing architecture 3000. The coupling 3015 may be implemented with any of a variety of technologies or combinations of technologies by which signals are optically and/or electrically conveyed. Further, at least portions of couplings 3015 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 3010 may include any of a wide variety of commercially available processors, employing any of a wide variety of technologies and implemented with one or more cores physically combined in any of a number of ways.

As previously discussed, the storage 3030 may include one or more distinct storage devices based on any of a wide variety of technologies or combinations of technologies. More specifically, as depicted, the storage 3030 may include one or more of a volatile storage 3031 (e.g., solid state storage based on one or more forms of RAM technology), a non-volatile storage 3032 (e.g., solid state, ferromagnetic or other storage not requiring a constant provision of electric power to preserve their contents), and a removable media storage 3033 (e.g., removable disc or solid state memory card storage by which information may be conveyed between computing devices). This depiction of the storage 3030 as possibly comprising multiple distinct types of storage is in recognition of the commonplace use of more than one type of storage device in computing devices in which one type provides relatively rapid reading and writing capabilities enabling more rapid manipulation of data by the processor element 3010 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 3031 is present and is based on RAM technology, the volatile storage 3031 may be communicatively coupled to coupling 3015 through a storage controller 3035*a* providing an appropriate interface to the volatile storage 3031 that perhaps employs row and column addressing, and where the storage controller 3035*a* may perform row refreshing and/or other maintenance tasks to aid in preserving information stored within the volatile storage 3031. By way of another example, where the non-volatile storage 3032 is present and includes one or more ferromagnetic and/or solid-state disk drives, the non-volatile storage 3032 may be communicatively coupled to coupling 3015 through a storage controller 3035*b* providing an appropriate interface to the non-volatile storage 3032 that perhaps employs addressing of blocks of information and/or of cylinders and sectors. By way of still another example, where the removable media storage 3033 is present and includes one or more optical and/or solid-state disk drives employing one or more pieces of removable machine-readable storage media 3039, the removable media storage 3033 may be communicatively coupled to coupling 3015 through a storage controller 3035*c* providing an appropriate interface to the removable media storage 3033 that perhaps employs addressing of blocks of information, and where the storage controller 3035*c* may coordinate read, erase and write operations in a manner specific to extending the lifespan of the machine-readable storage media 3039.

One or the other of the volatile storage 3031 or the non-volatile storage 3032 may include an article of manufacture in the form of a machine-readable storage media on which a routine comprising a sequence of instructions executable by the processor element 3010 may be stored, depending on the technologies on which each is based. By way of example, where the non-volatile storage 3032 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 3032 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 3010 may initially be stored on the machine-readable storage media 3039, and the removable media storage 3033 may be subsequently employed in copying that routine to the non-volatile storage 3032 for longer term storage not requiring the continuing presence of the machine-readable storage media 3039 and/or the volatile storage 3031 to enable more rapid access by the processor element 3010 as that routine is executed.

As previously discussed, the interface 3090 may employ any of a variety of signaling technologies corresponding to any of a variety of communications technologies that may be employed to communicatively couple a computing device to one or more other devices. Again, one or both of various forms of wired or wireless signaling may be employed to enable the processor element 3010 to interact with input/output devices (e.g., the depicted example keyboard 3040 or printer 3045) and/or other computing devices, possibly through a network (e.g., the network 3099) or an interconnected set of networks. In recognition of the often greatly different character of multiple types of signaling and/or protocols that must often be supported by any one computing device, the interface 3090 is depicted as comprising multiple different interface controllers 3095*a*, 3095*b* and 3095c. The interface controller 3095a may employ any of a variety of types of wired digital serial interface or radio frequency wireless interface to receive serially transmitted messages from user input devices, such as the depicted keyboard 3040. The interface controller 3095b may employ any of a variety of cabling-based or wireless signaling, timings and/or protocols to access other computing devices through the depicted network 3099 (perhaps a network comprising one or more links, smaller networks, or perhaps the Internet). The interface 3095c may employ any of a variety of electrically conductive cabling enabling the use of either serial or parallel signal transmission to convey data to the depicted printer 3045. Other examples of devices that may be communicatively coupled through one or more interface controllers of the interface 3090 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 3050), such a computing device implementing the processing architecture 3000 may also incorporate the display interface 3055. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 3055 in a communicative coupling of the display 3050 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The disclosure now turns to providing various examples implementations.

Example 1

At least one machine-readable storage medium comprising instructions that when executed by a computing-system, cause the computing-system to: add a pseudo-entry stub (PES) address to an execution stack corresponding to a processor element, the PES address to identify a non-executable address; add an interrupt service routine (ISR) address to the execution stack in a position ahead of the PES address, the ISR address to identify a location of an ISR; restore one or more states of the processor element based on one or more first states of the processor element to be indicated by an ISR information element; and send a control signal to the processor element to cause the processor element to execute the ISR.

Example 2

The at least one machine-readable storage medium of example 1, comprising instructions that when executed by the computing system, cause the computing system to receive a first interrupt, the first interrupt to correspond to an interrupted process, the ISR to correspond to the first interrupt.

Example 3

The at least one machine-readable storage medium of example 2, comprising instructions that when executed by the computing system, cause the computing system to generate the ISR information element in response to receipt of the first interrupt, the ISR information element to include an indication of the one or more first states of the processor element and an instruction pointer to include an indication of the interrupted process.

Example 4

The at least one machine-readable storage medium of example 3, comprising instructions that cause the computing-system to determine whether the first interrupt corresponds to a PES address page fault and select the pseudo-entry stub (PES) address, the selecting the pseudo-entry stub (PES) address and the adding the PES address to the execution stack based on a determination that the first interrupt does not correspond to a PES address page fault.

Example 5

The at least one machine-readable storage medium of example 4, comprising instructions that cause the computing-system to: identify an index in a bitwise array of lock bits; lock the index; and select the index as the PES address.

Example 6

The at least one machine-readable storage medium of example 5, the bitwise array of lock bits comprising a memory page of addresses not executable by the processing element.

Example 7

The at least one machine-readable storage medium of example 5, comprising instructions that cause the computing-system to: identify a first free position in the bitwise array of lock bits; and select the first free position as the index.

Example 8

The at least one machine-readable storage medium of example 7, comprising instructions that cause the computing-system to store an indication of the location of the ISR information element in the first free position.

Example 9

The at least one machine-readable storage medium of example 5, comprising instructions that cause the computing-system to: execute one or more ISR instrumentation operations; retrieve, based on a received second interrupt, the instruction pointer from the ISR information element; add the instruction pointer to the execution stack; restore one or more states of the processor element based on the one or more first states; and send a control signal to the processor element to cause the processor element to execute the instruction pointer.

Example 10

The at least one machine-readable storage medium of example 9, comprising instructions that cause the computing-system to determine whether the first interrupt corresponds to a PES address page fault, the retrieving the instruction pointer from the ISR information element, the adding the instruction pointer to the execution stack, the restoring one or more states of the processor element based on the one or more first states, and the sending the control signal to the processor element to cause the processor element to execute the instruction pointer based on a determination that the first interrupt does correspond to a PES address page fault.

Example 11

The at least one machine-readable storage medium of example 10, comprising instructions that cause the computing-system to: derive a difference between the PES address and a base address of the PES array; determine the index as the quotient of the difference divided by the size of the PES array; and retrieve the instruction pointer based on the index.

Example 12

The at least one machine-readable storage medium of example 3, comprising instructions that cause the computing-system to: retrieve a first interrupt descriptor table (IDT) address from an interrupt descriptor table register (IDTR), the IDT address to identify a location of an original IDT; add an indication of the IDT address to the ISR information element; and load a second IDT address to the IDTR, the second IDT address to identify a location of a modified IDT, the modified IDT to include a plurality of interrupt vectors.

Example 13

The at least one machine-readable storage medium of example 12, comprising instructions that cause the computing-system to add a one of the plurality of interrupt vectors to the execution stack based on the first interrupt and the modified IDT.

Example 14

The at least one machine-readable storage medium of example 1, comprising instructions that cause the computing-system to: execute the ISR; and send a control signal to the processor element to include an indication to execute the PES address.

Example 15

An apparatus, comprising: logic, a portion of which is implemented in hardware, the logic to comprise: an ISR loading component to: add an indication of an instruction pointer to an interrupt service routine (ISR) information element, the instruction pointer to correspond to a process interrupted by a first interrupt; and add an ISR address to an execution stack corresponding to a processor element in a position ahead of a pseudo-entry stub (PES) address, the ISR address to identify a location of an ISR, the PES address to identify a non-executable address; and an ISR execution component to: restore one or more states of the processor element based on one or more first states of the processor element to be identified by the ISR information element; and send a control signal to the processor element to cause the processor element to execute the ISR.

Example 16

The apparatus of example 15, comprising a common exit handler component to generate, based on the first interrupt, the ISR information element, the ISR information element to include an indication of the one or more first states of the processor element.

Example 17

The apparatus of example 16, comprising a PES component to select the PES address and add the PES address to the execution stack.

Example 18

The apparatus of example 17, the ISR execution component to add an indication of an instruction pointer to the ISR information element, the instruction pointer to correspond to a process interrupted by the first interrupt.

Example 19

The apparatus of example 17, the common exit handler component to determine whether the first interrupt corresponds to a PES address page fault; and the PES component to select the pseudo-entry stub (PES) address and add the PES address to the execution stack based on a determination that the first interrupt does not correspond to a PES address page fault.

Example 20

The apparatus of example 19, the PES component to: identify an index in a bitwise array of lock bits; lock the index; and select the index as the PES address.

Example 21

The apparatus of example 20, the bitwise array of lock bits comprising a memory page of addresses not executable by the processing element.

Example 22

The apparatus of example 20, the PES component to: identify a first free position in the bitwise array of lock bits; and select the first free position as the index.

Example 23

The apparatus of example 22, the common exit handler component to store an indication of the location of the ISR information element in the first free position.

Example 24

The apparatus of example 20, comprising: an instrumentation component to execute one or more ISR instrumentation operations; and an instrumentation exit component to:
retrieve, based on a received second interrupt, the instruction pointer from the ISR information element; add the instruction pointer to the execution stack; restore one or more states of the processor element based on the one or more first states; and send a control signal to the processor element to cause the processor element to execute the instruction pointer.

Example 25

The apparatus of example 24, the common exit handler component to determine whether the first interrupt corresponds to a PES address page fault; and the instrumentation exit component to: retrieve the instruction pointer from the ISR information element, add the instruction pointer to the execution stack, restore one or more states of the processor element based on the one or more first states, and send the control signal to the processor element to cause the processor element to execute the instruction pointer based on a determination that the first interrupt does correspond to a PES address page fault.

Example 26

The apparatus of example 25, the instrumentation exit component to: derive a difference between the PES address and a base address of the PES array; determine the index as the quotient of the difference divided by the size of the PES array; and retrieve the instruction pointer based on the index.

Example 27

The apparatus of example 18, comprising an ISR component to: execute the ISR; and send a control signal to the processor element to include an indication to execute the PES address.

Example 28

The apparatus of example 18, comprising an interrupt descriptor table loading component to: retrieve a first interrupt descriptor table (IDT) address from an interrupt descriptor table register (IDTR), the IDT address to identify a location of an original IDT; add an indication of the IDT address to the ISR information element; and load a second IDT address to the IDTR, the second IDT address to identify a location of a modified IDT, the modified IDT to include a plurality of interrupt vectors.

Example 29

The apparatus of example 28, comprising an initial exit handler component to add a one of the plurality of interrupt vectors to the execution stack based on the first interrupt and the modified IDT.

Example 30

A computer-implemented method, comprising: adding a pseudo-entry stub (PES) address to an execution stack corresponding to a processor element, the PES address to identify a non-executable address; adding an interrupt service routine (ISR) address to the execution stack in a position ahead of the PES address, the ISR address to identify a location of an ISR; restoring one or more states of the processor element based on one or more first states of the processor element to be indicated by an ISR information element; and sending a control signal to the processor element to cause the processor element to execute the ISR.

Example 31

The computer-implemented method of example 30, comprising selecting a pseudo-entry stub (PES) address, the PES address to identify a non-executable address.

Example 32

The computer-implemented method of example 31, comprising receiving a first interrupt, the first interrupt to correspond to an interrupted process, the ISR to correspond to the first interrupt.

Example 33

The computer-implemented method of example 32, comprising generating the ISR information element in response to receipt of the first interrupt, the ISR information element to include an indication of the one or more first states of the processor element and an instruction pointer to include an indication of the interrupted process.

Example 34

The computer-implemented method of example 33, comprising determining whether the first interrupt corresponds to a PES address page fault and selecting the pseudo-entry stub (PES) address based on a determination that the first interrupt does not correspond to a PES address page fault.

Example 35

The computer-implemented method of example 34, comprising: identifying an index in a bitwise array of lock bits; locking the index; and selecting the index as the PES address.

Example 36

The computer-implemented method of example 35, the bitwise array of lock bits comprising a memory page of addresses not executable by the processing element.

Example 37

The computer-implemented method of example 35, comprising: identifying a first free position in the bitwise array of lock bits; and selecting the first free position as the index.

Example 38

The computer-implemented method of example 37, comprising storing an indication of the location of the ISR information element in the first free position.

Example 39

The computer-implemented method of example 35, comprising: executing one or more ISR instrumentation operations; retrieving, based on a received second interrupt, the instruction pointer from the ISR information element; adding the instruction pointer to the execution stack; restoring one or more states of the processor element based on the one or more first states; and sending a control signal to the processor element to cause the processor element to execute the instruction pointer.

Example 40

The computer-implemented method of example 39, comprising determining whether the first interrupt corresponds to a PES address page fault, the retrieving the instruction pointer from the ISR information element, the adding the instruction pointer to the execution stack, the restoring one or more states of the processor element based on the one or more first states, and the sending the control signal to the processor element to cause the processor element to execute the instruction pointer based on a determination that the first interrupt does correspond to a PES address page fault.

Example 41

The computer-implemented method of example 40, comprising: deriving a difference between the PES address and a base address of the PES array; determining the index as the quotient of the difference divided by the size of the PES array; and retrieving the instruction pointer based on the index.

Example 42

The computer-implemented method of example 35, comprising: executing the ISR; and sending a control signal to the processor element to include an indication to execute the PES address.

Example 43

The computer-implemented method of example 35, comprising: retrieving a first interrupt descriptor table (IDT) address from an interrupt descriptor table register (IDTR), the IDT address to identify a location of an original IDT; adding an indication of the IDT address to the ISR information element; and loading a second IDT address to the IDTR, the second IDT address to identify a location of a modified IDT, the modified IDT to include a plurality of interrupt vectors.

Example 44

The computer-implemented method of example 43, comprising adding a one of the plurality of interrupt vectors to the execution stack based on the first interrupt and the modified IDT.

Example 45

An apparatus for a device, the apparatus comprising means for performing the method of any one of examples 30 to 44.

The invention claimed is:

1. At least one non-transitory machine-readable storage medium comprising instructions that when executed by a computing-system, cause the computing-system to:
add a pseudo-entry stub (PES) address to an execution stack corresponding to a processor element, the PES address to identify a non-executable address;
add an interrupt service routine (ISR) address to the execution stack in a position ahead of the PES address, the ISR address to identify a location of an ISR;

restore one or more states of the processor element based on one or more first states of the processor element to be indicated by an ISR information element; and send a control signal to the processor element to cause the processor element to execute the ISR.

2. The at least one non-transitory machine-readable storage medium of claim 1, comprising instructions that when executed by the computing system, cause the computing system to receive a first interrupt, the first interrupt to correspond to an interrupted process, the ISR to correspond to the first interrupt.

3. The at least one non-transitory machine-readable storage medium of claim 2, comprising instructions that when executed by the computing system, cause the computing system to generate the ISR information element in response to receipt of the first interrupt, the ISR information element to include an indication of the one or more first states of the processor element and an instruction pointer to include an indication of the interrupted process.

4. The at least one non-transitory machine-readable storage medium of claim 3, comprising instructions that cause the computing-system to determine whether the first interrupt corresponds to a PES address page fault and select the pseudo-entry stub (PES) address, the selecting the pseudo-entry stub (PES) address and the adding the PES address to the execution stack based on a determination that the first interrupt does not correspond to a PES address page fault.

5. The at least one non-transitory machine-readable storage medium of claim 4, comprising instructions that cause the computing-system to:
identify an index in a bitwise array of lock bits;
lock the index; and
select the index as the PES address.

6. The at least one non-transitory machine-readable storage medium of claim 5, the bitwise array of lock bits comprising a memory page of addresses not executable by the processing element.

7. The at least one non-transitory machine-readable storage medium of claim 5, comprising instructions that cause the computing-system to:
identify a first free position in the bitwise array of lock bits; and
select the first free position as the index.

8. The at least one non-transitory machine-readable storage medium of claim 7, comprising instructions that cause the computing-system to store an indication of the location of the ISR information element in the first free position.

9. The at least one non-transitory machine-readable storage medium of claim 5, comprising instructions that cause the computing-system to:
execute one or more ISR instrumentation operations;
retrieve, based on a received second interrupt, the instruction pointer from the ISR information element;
add the instruction pointer to the execution stack;
restore one or more states of the processor element based on the one or more first states; and
send a control signal to the processor element to cause the processor element to execute the instruction pointer.

10. The at least one non-transitory machine-readable storage medium of claim 9, comprising instructions that cause the computing-system to determine whether the first interrupt corresponds to a PES address page fault, the retrieving the instruction pointer from the ISR information element, the adding the instruction pointer to the execution stack, the restoring one or more states of the processor element based on the one or more first states, and the sending the control signal to the processor element to cause the processor element to execute the instruction pointer based on a determination that the first interrupt does correspond to a PES address page fault.

11. The at least one non-transitory machine-readable storage medium of claim 10, comprising instructions that cause the computing-system to:
derive a difference between the PES address and a base address of the PES array;
determine the index as the quotient of the difference divided by the size of the PES array; and
retrieve the instruction pointer based on the index.

12. The at least one non-transitory machine-readable storage medium of claim 3, comprising instructions that cause the computing-system to:
retrieve a first interrupt descriptor table (IDT) address from an interrupt descriptor table register (IDTR), the IDT address to identify a location of an original IDT;
add an indication of the IDT address to the ISR information element; and
load a second IDT address to the IDTR, the second IDT address to identify a location of a modified IDT, the modified IDT to include a plurality of interrupt vectors.

13. An apparatus, comprising:
logic, a portion of which is implemented in hardware, the logic to comprise:
an ISR loading component to:
add an indication of an instruction pointer to an interrupt service routine (ISR) information element, the instruction pointer to correspond to a process interrupted by a first interrupt; and
add an ISR address to an execution stack corresponding to a processor element in a position ahead of a pseudo-entry stub (PES) address, the ISR address to identify a location of an ISR, the PES address to identify a non-executable address; and
an ISR execution component to:
restore one or more states of the processor element based on one or more first states of the processor element to be identified by the ISR information element; and
send a control signal to the processor element to cause the processor element to execute the ISR.

14. The apparatus of claim 13, comprising:
a common exit handler component to generate, based on the first interrupt, the ISR information element, the ISR information element to include an indication of the one or more first states of the processor element; and
a PES component to:
select the PES address; and
add the PES address to the execution stack.

15. The apparatus of claim 14, the common exit handler component to determine whether the first interrupt corresponds to a PES address page fault; and the PES component to select the pseudo-entry stub (PES) address and add the PES address to the execution stack based on a determination that the first interrupt does not correspond to a PES address page fault.

16. The apparatus of claim 15, the PES component to identify a first free position in a bitwise array of lock bits; lock the first free position; and select the first free position as the PES address; and the common exit handler component to store an indication of the location of the ISR information element in the first free position, the bitwise array of lock bits comprising a memory page of addresses not executable by the processing element.

17. The apparatus of claim 15, comprising:
an instrumentation component to execute one or more ISR instrumentation operations; and
an instrumentation exit component to:
retrieve, based on a received second interrupt, the instruction pointer from the ISR information element;
add the instruction pointer to the execution stack;
restore one or more states of the processor element based on the one or more first states; and
send a control signal to the processor element to cause the processor element to execute the instruction pointer.

18. The apparatus of claim 17, the common exit handler component to determine whether the first interrupt corresponds to a PES address page fault; and the instrumentation exit component to: retrieve the instruction pointer from the ISR information element, add the instruction pointer to the execution stack, restore one or more states of the processor element based on the one or more first states, and send the control signal to the processor element to cause the processor element to execute the instruction pointer based on a determination that the first interrupt does correspond to a PES address page fault.

19. The apparatus of claim 18, the instrumentation exit component to:
derive a difference between the PES address and a base address of the PES array;
determine the first free position as the quotient of the difference divided by the size of the PES array; and
retrieve the instruction pointer based on the first free position.

20. The apparatus of claim 13, comprising an interrupt descriptor table loading component to:
retrieve a first interrupt descriptor table (IDT) address from an interrupt descriptor table register (IDTR), the IDT address to identify a location of an original IDT;
add an indication of the IDT address to the ISR information element; and
load a second IDT address to the IDTR, the second IDT address to identify a location of a modified IDT, the modified IDT to include a plurality of interrupt vectors.

21. A computer-implemented method, comprising:
receiving at a processor element, a first interrupt, the first interrupt to correspond to an interrupted process;
generating an interrupt service routine (ISR) information element, the ISR information element to include an indication of one or more first states of the processor element and an instruction pointer to include an indication of the interrupted process;
selecting a pseudo-entry stub (PES) address, the PES address to identify a non-executable address;
adding the PES address to an execution stack corresponding to the processor element;
adding an ISR address to the execution stack in a position ahead of the PES address, the ISR address to identify a location of an ISR;
restoring one or more states of the processor element based on the one or more first states; and
sending a control signal to the processor element to cause the processor element to execute the ISR.

22. The computer-implemented method of claim 21, comprising determining whether the first interrupt corresponds to a PES address page fault, the selecting the pseudo-entry stub (PES) address and the adding the PES address to the execution stack based on a determination that the first interrupt does not correspond to a PES address page fault.

23. The computer-implemented method of claim 22, comprising:
identifying an index in a bitwise array of lock bits;
locking the index; and
selecting the index as the PES address.

24. The computer-implemented method of claim 23, comprising:
executing one or more ISR instrumentation operations;
retrieving, based on a received second interrupt, the instruction pointer from the ISR information element;
adding the instruction pointer to the execution stack;
restoring one or more states of the processor element based on the one or more first states; and
sending a control signal to the processor element to cause the processor element to execute the instruction pointer.

25. The computer-implemented method of claim 24, comprising determining whether the first interrupt corresponds to a PES address page fault, the retrieving the instruction pointer from the ISR information element, the adding the instruction pointer to the execution stack, the restoring one or more states of the processor element based on the one or more first states, and the sending the control signal to the processor element to cause the processor element to execute the instruction pointer based on a determination that the first interrupt does correspond to a PES address page fault.

* * * * *